United States Patent [19]

Nishikawa et al.

[11] Patent Number: 4,843,480
[45] Date of Patent: Jun. 27, 1989

[54] IMAGE READING APPARATUS FOR REMOVING DISTURBANCES IN OUTPUT IMAGES

[75] Inventors: Masaaki Nishikawa, Yokohama; Satoshi Shimizu, Ohmiya, both of Japan

[73] Assignee: Cannon Kabushiki Kaisha, Tokyo, Japan

[21] Appl. No.: 92,190

[22] Filed: Sep. 2, 1987

[30] Foreign Application Priority Data

Sep. 12, 1986 [JP] Japan .................... 61-215091

[51] Int. Cl.$^4$ .................... H04N 1/10; H04N 1/12
[52] U.S. Cl. .................... 358/293; 358/285
[58] Field of Search .................... 358/253, 285

[56] References Cited

U.S. PATENT DOCUMENTS

| | | | |
|---|---|---|---|
| 4,159,488 | 6/1979 | Tanaka et al. | 358/293 |
| 4,268,867 | 5/1981 | Traino | 358/293 X |
| 4,432,023 | 2/1984 | Mehalek | 358/293 |
| 4,466,021 | 8/1984 | Hibbard | 358/293 |

FOREIGN PATENT DOCUMENTS

| | | | |
|---|---|---|---|
| 62479 | 10/1982 | European Pat. Off. | 358/293 |
| 58-34674 | 3/1983 | Japan | 358/285 |

*Primary Examiner*—Edward L. Coles, Sr.
*Assistant Examiner*—E. Anne Faris
*Attorney, Agent, or Firm*—Fitzpatrick, Cella, Harper & Scinto

[57] ABSTRACT

An image reading apparatus comprising: a motor and power transmission belt for feeding a recording medium on which image information is recorded; a photoelectric transducer for reading the image information as image data; two buffers for storing therein the image data read by the transducer and out of which the image data is read, the storing and reading of the image data being performed alternately; and a CPU for controlling the motor and belt, the transducer, and the two buffers; characterized by either a buffer or a gate for preventing a delay in the transfer of the image data due to a delay in the response of the motor and belt.

7 Claims, 6 Drawing Sheets (a)

(b)

IMAGE READING APPARATUS FOR REMOVING DISTURBANCES IN OUTPUT IMAGES

BACKGROUND OF THE INVENTION

1. Field of the Invention

This invention relates to image reading apparatus, particularly those adapted for reading an image at high speeds.

2. Related Background Art

The structure and operation of a conventional image reading apparatus will now be described with reference to FIGS. 8–10(a).

In FIG. 8, reference numeral 1 denotes a photoelectric transducer which reads image information on an original document 2; 3, a light source which illuminates the original 2; 4, a motor to feed the original; 5, a power transmission belt; and 6, paper feed rollers which feed document 2 line by the rotation of motor 4.

Motor 4 is controlled by a Motor signal output by a motor drive circuit 7 which in turn is controlled by a Start signal output from a CPU (central processing unit) 8. The light from the light source 3 reflected by the original 2 is sensed as image information by transducer 1 via a lens 9. Transducer 1 has a time for which image information is photoelectrically converted and stored as electric charges (hereinafter referred to as the storage time). CPU 8 outputs to the transducer a timing signal SH having a period equal to the storage time to control the storage and outputting of image data in and out of the transducer. Image data output from the transducer synchronously with the timing signal SH is written alternately into buffers A and B synchronously with write signals Ain and Bin output from CPU 8 and read out alternately synchronously with read signals About and Bout.

The timing signal SH is inherently determined by the storage time of the transducer. Alternate writing and reading of the image data sensed by the transducer 1 into and out of buffers A and b synchronously with the Motor signal serves to eliminate a time delay in the data transfer due to the storage time of the transducer.

Although the above image reading apparatus moves the read position via a drive system including motor 4 and force transmission belt 5, the delay in the response time of the drive system is not considered. Therefore, when the time delay caused by the drive system corresponds to, for example, one storage time of the transducer 1, high speed intermittent reading would involve reading unnecessary data which disturbs the output image. FIG. 10(a) shows an image formed by printing out the image data obtained by intermittently reading every 64 lines at high speeds, using this conventional apparatus. The timing chart of FIG. 9 shows the relationship between respective signals and output data where the time delay of the drive system corresponds to one storage time of the transducer. Because the time delay of the motor corresponding to one storage time occurs, the transducer reads image information in accordance with a timing signal SH having the same timing as a Start signal output by CPU 8 to motor drive circuit 17. Therefore, not the data in lines a, b, c to be read, but the data in lines a', a, b, and not the image data in lines d, e, f, g, but the data in lines d', d, e, f, are read and output so that disturbances in the output image as shown in FIG. 10(a) will occur.

SUMMARY OF THE INVENTION

It is an object of this invention to provide an image reading apparatus which prevents a delay in the transfer of image data recorded on a recording medium due to a time delay in the response of a drive system which feeds the recording medium to cause no disturbances in the output image during high speed intermittent reading.

DETAILED DESCRIPTION OF THE PREFERRED EMBODIMENT

(First Embodiment)

Figure 3:
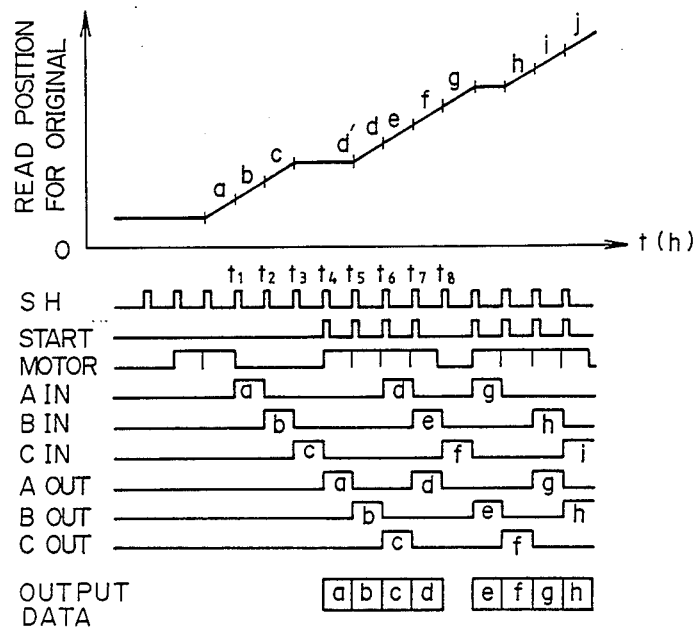
FIG. 3 is a timing chart for illustrating the operation of the first embodiment.

A first embodiment of this invention will now be described with reference to FIGS. 1–3. In this invention, one storage time of photoelectric transducer 1 is set in advance to the time delay of the drive system. Namely, the time delays Tm of the drive systems are measured uniformly so long as the drive systems are the same, so that one storage time of the transducer is set to that time delay Tm as shown in FIG. 2.

Figure 1:
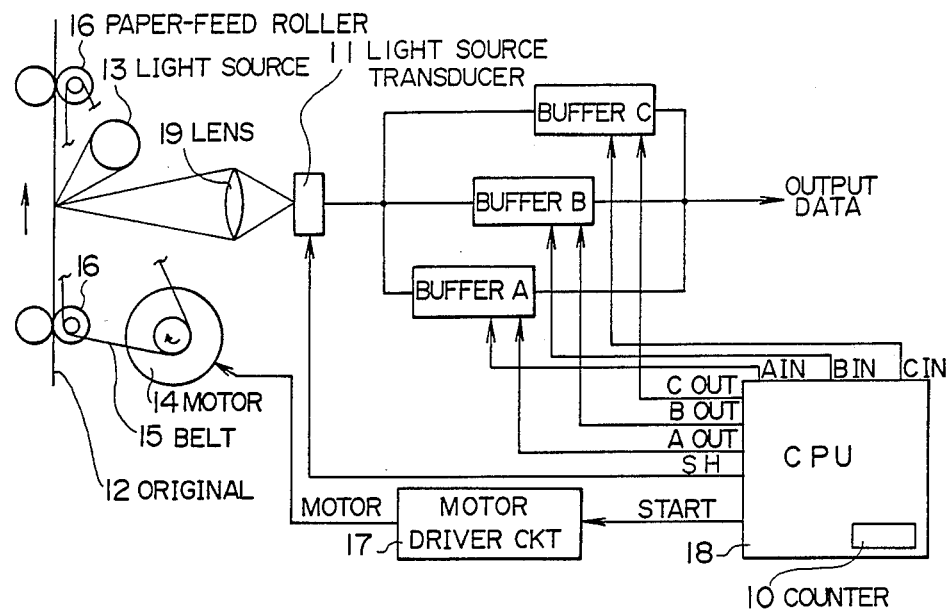
FIG. 1 is a block diagram of a first embodiment of this invention.
Figure 2:
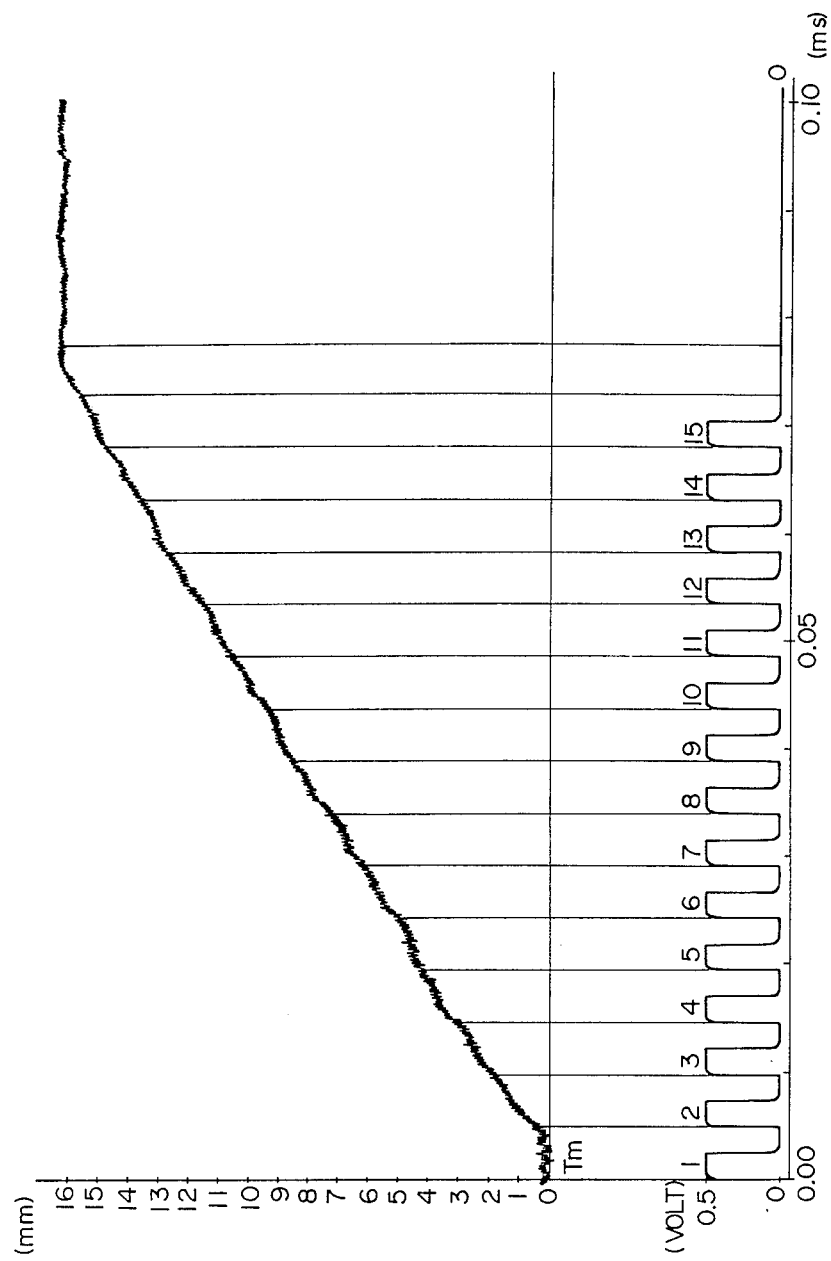
FIG. 2 illustrates the relationship between original document reading position and timing signal SH.

In FIG. 1, reference numeral 11 denotes a photoelectric transducer which reads image information on an original document 12; 13, a light source which illumines the original; 14, a motor to feed the original; 15, a power transmission belt; and 16, paper-feed rollers which feed the document 12 line by line by the rotation of motor 14.

Motor 14 is controlled by a Motor signal output by a motor drive circuit 17 which is controlled by a Start signal output from a CPU (central processing unit) 18. The light from light source 13 reflected by the original 12 is sensed as image information by transducer 11 via a lens 19. CPU 18 outputs to the transducer a timing signal SH having a period equal to the storage time to control the storage and outputting of image data in and out of the transducer. This structure is substantially the same as the conventional one.

The image data output from transducer 11 synchronously with a timing signal SH is cyclically written sequentially into buffers A, B and C in accordance with synchronous write signals Ain, Bin and Cin delayed by two storage times relative to the Motor signal and cyclically read out cyclically sequentially is accordance with signals About, Bout and Cout. Such cyclic writing and reading of image data by the use of additional buffer C eliminates an adverse influence of a delay in the response of the drive system including motor 14 and belt 15 on the output image.

The operation of the above embodiment will now be described in more detail with reference to the timing chart of FIG. 3. The transducer 11 reads image data synchronously with a timing signal SH output by CPU 18. When a Start signal is output from CPU 18 to the motor drive circuit 17, the motor 14 starts to operate delayed by the storage time interval of the transducer, so that transducer 11 will read unnecessary image data, for example, in a line d'. Since, however, three buffers A, B, C are provided and if write signals for image data are synchronized two storage times delayed relative to the Motor signal, two storage times are available to a waiting time for data transfer. For example, if write signals Ain, Bin and Cin and read signals Aout, Bout and Cout are output as shown in FIG. 2, the image signal n line d, will not be written into any of buffers A, B and C. Namely, buffers A, B and C have image data in lines a, b and c read by timing t1, t2 and t3, respectively, in the timing chart of FIG. 2. When a Motor signal is output from CPU 18 at timing t4 in order to read the image data in the next line, an unnecessary line d' will be read due to a delay in the response of the motor 14. However, at the next timing t5, the image data in line b has been read. After the next timing t6, write signals Ain, Bin and Cin are output from CPU 18 synchronously delayed by two storage times counted by a counter 10 within CPU 18 relative to a Motor signal, so that the image data in unnecessary line d' is not written into any of the buffers.

Figure 10:
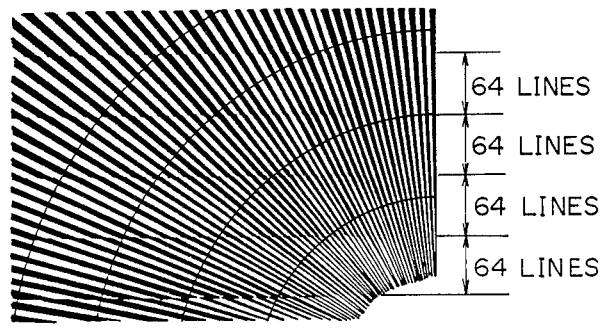
FIG. 10(a) illustrates the output image from the conventional image reading apparatus.
FIG. 10(b) illustrates the output image from the image reading apparatus according to this invention.
Figure 10:
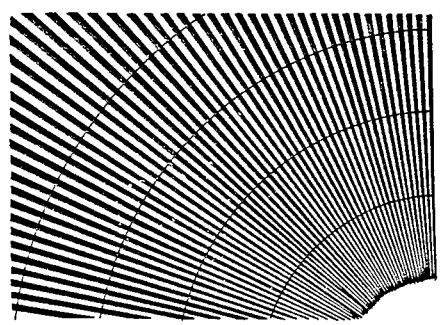

As described above, provision of one additional buffer and repetitive writing of image data into the respective buffers at the synchronous timing delayed by two storage times relative to a Motor signal will cause no disturbances in the output image, as shown in FIG. 10(b), although the drive system may have a response delay equal to one storage time.

While in the embodiment the time delay of the drive system is shown as being one storage time, this invention is not restricted to this. For example, if the delay is two storage times, four buffers may be provided and so on.

(Second Embodiment)

Figure 4:
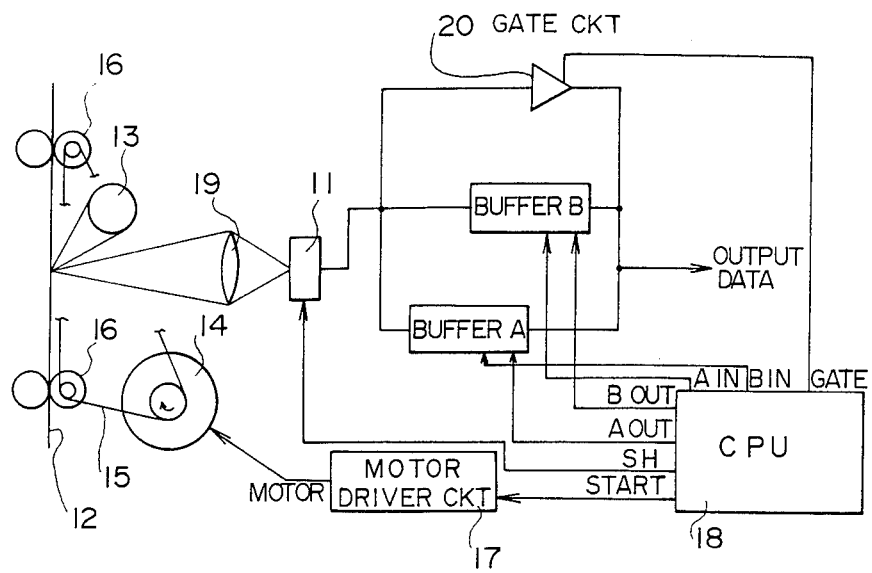
FIG. 4 is a block diagram of a second embodiment of this invention.
Figure 5:
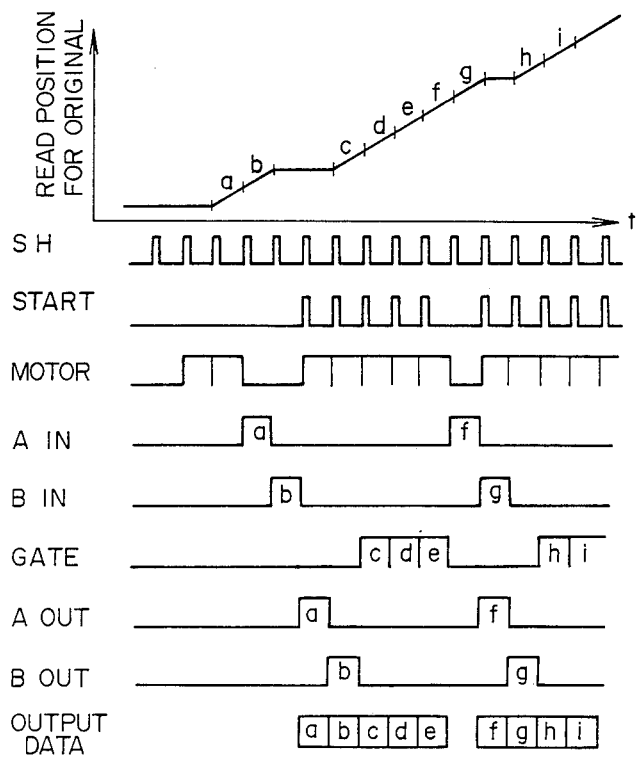
FIG. 5 is a timing chart showing the operation of the second embodiment.

The second embodiment additionally uses a gate 20 instead of the buffer C in the first embodiment, as shown in FIG. 4. CPU 18 detects when the image data written into buffers A and B is both read, and opens the gate 19 at that timing and synchronously with a Motor signal to thereby output the image information directly from transducer 11. Thus such arrangement affords two storage times as a waiting time after the Motor signal is input, so that a similar effect to that of the first embodiment is provided. Furthermore, the whole circuit structure is simplified compared to that involving the buffer C to perform similar data processing. FIG. 5 is a timing chart showing the operation of the second embodiment.

(Third Embodiment)

Figure 6:
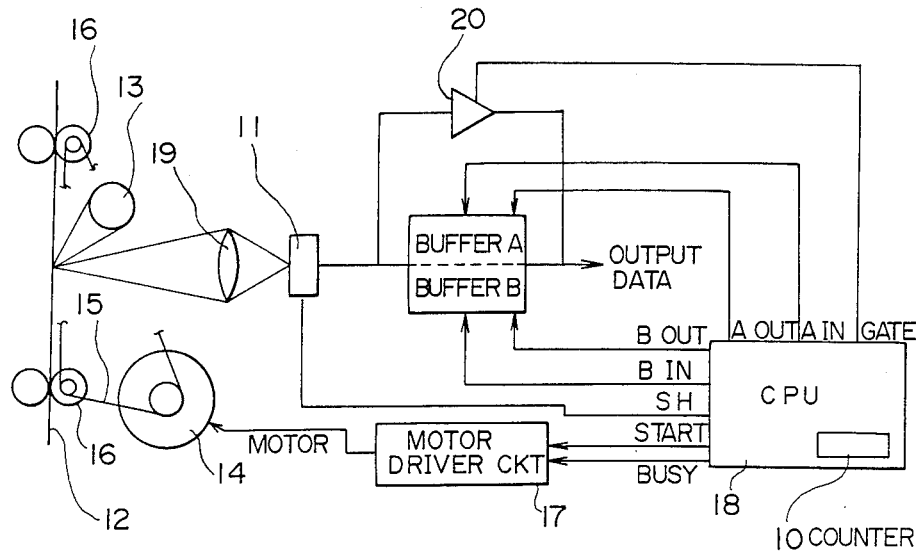
FIG. 6 is a block diagram of a third embodiment of this invention.
Figure 7:
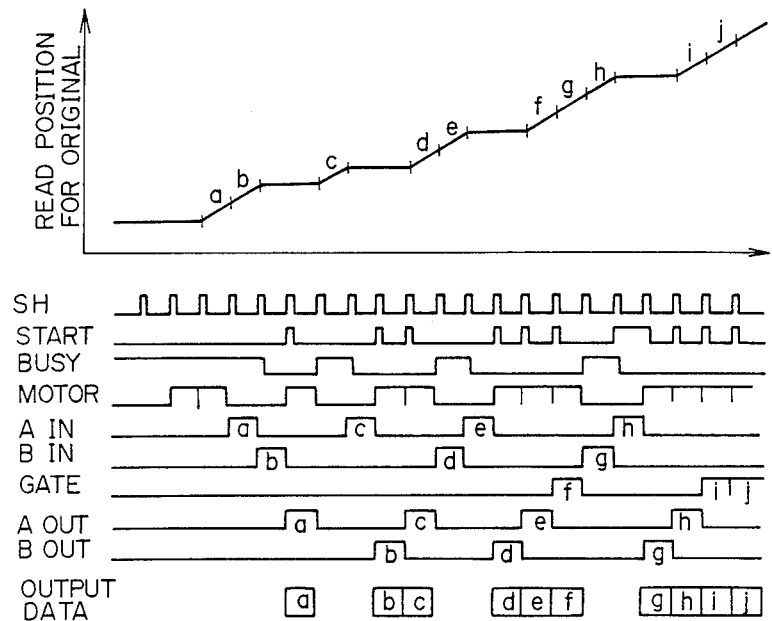
FIG. 7 is a flowchart showing the operation of the third embodiment.
Figure 8:
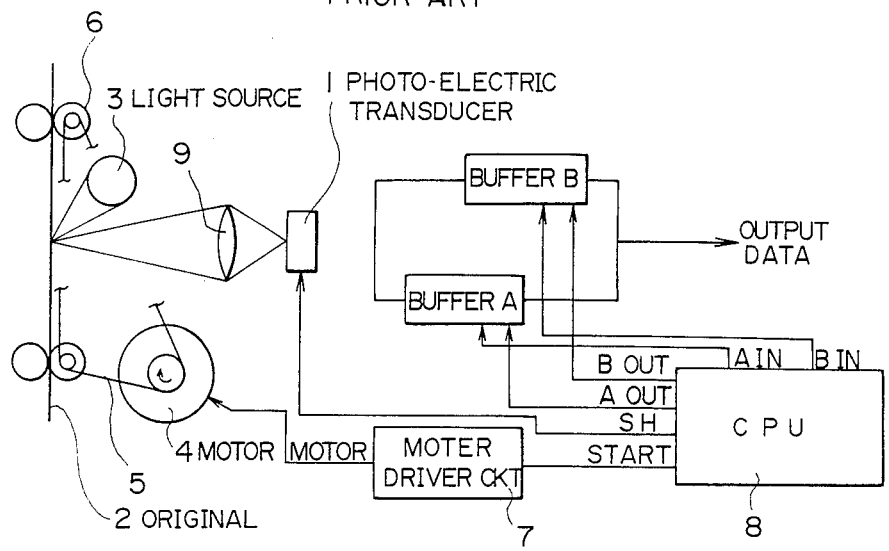
FIG. 8 is a block diagram of a conventional image reading apparatus.
Figure 9:
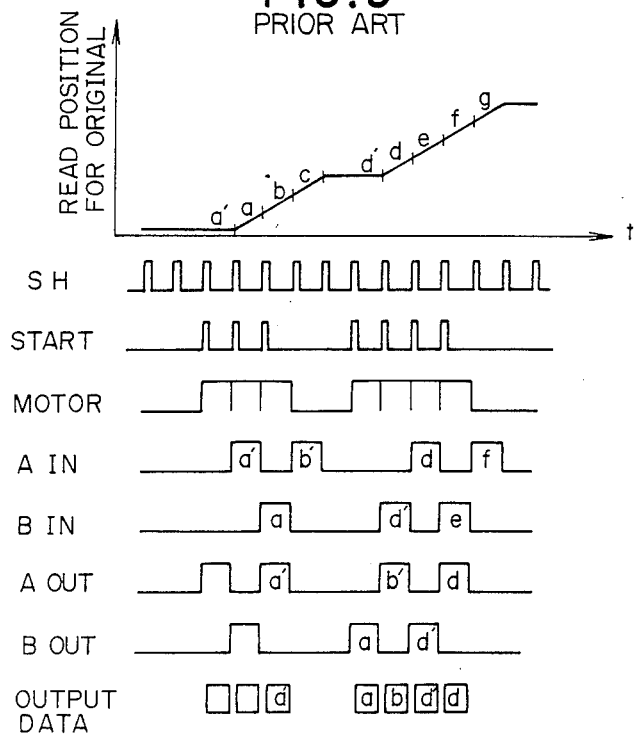
FIG. 9 is a block diagram showing the operation of the conventional apparatus.

As shown in FIG. 6, the third embodiment includes a simplified circuit structure in which a single buffer is used instead of the two separate buffers A and B in the second embodiment. In this embodiment, it is impossible to write image data into and to read image data out of buffers A and B at the same time, so that the motor drive circuit receives a busy signal which causes the motor to have a waiting time (namely, inputs no start signal), as shown in FIG. 7.

The invention has the structure mentioned above, so that although there is a delay time in the response of the drive system including the motor and power transmission belt which feeds an original document, disturbances will not be caused in the output image during high speed intermittent reading, which is a remarkable advantage of this invention.

What is claimed is:

1. An image reading apparatus comprising:
   means for feeding a recording medium on which image information is recorded;
   means for reading the image information as image data;
   storage means for storing therein the image data read by said reading means;
   output delay means for allowing output of the image data to be delayed in response to a delay time in the response of said feeding means; and
   means for controlling said feeding means, said reading means, and said storage means, wherein said control means also controls said output delay means such that disturbance of the output of the image data due to the delay time in the response of said feeding means can be prevented by the delay in the output of the image data.

2. An image reading apparatus of claim 1, wherein said output delay means comprises additional storage means provided in parallel with said storage means and wherein the image data is stored into and read from said storage means and said additional storage means cyclically by said controlling means.

3. An image reading apparatus of claim 1, wherein said output delay means comprises a gate provided in parallel with said storage means, the gate being opened by said control means for allowing the direct reading of the image data from the gate when no image data is stored in said storage means.

4. An image reading apparatus comprising:
   means for feeding a recording medium on which image information is recorded;
   a photoelectric transducer for reading the image information as image data;
   first and second storage means for alternately storing therein the image data read by said transducer, the image data being alternately read from said first and second storage means;
   output delay means for allowing output of the image data to be delayed in response to a delay time in the response of said feeding means; and
   means for controlling said feeding means, the transducer, and said first and second storage means, wherein said control means also controls said output delay means such that disturbance of the output of the image data due to the delay time in the response of said feeding means can be prevented by the delay in the output of the image data.

5. An image reading apparatus of claim 4, wherein said output delay means comprises additional storage means provided in parallel with said first and second storage means and wherein the image data is stored into and read from said first and second storage means and said additional storage means cyclically by said controlling means.

6. An image reading apparatus of claim 4, wherein said output delay means comprises a gate provided in parallel with said first and second storage means and opened by said control means for allowing the direct reading of the image data from said gate when no image data is stored in said first and second storage means.

7. An image reading apparatus of claim 4, wherein the storage time for the image data in the photoelectric transducer is a natural number times as long as the delay time of the response of said feeding means.

* * * * *

UNITED STATES PATENT AND TRADEMARK OFFICE
CERTIFICATE OF CORRECTION

PATENT NO. : 4,843,480

DATED : June 27, 1989

INVENTOR(S) : Nishikawa, et al.

It is certified that error appears in the above-identified patent and that said Letters Patent is hereby corrected as shown below:

Title page:

[73] Assignee:

"Cannon Kabushiki Kaisha," should read
--Canon Kabushiki Kaisha--.

COLUMN 1:

Line 20, "line by" should read --line by line by--.

Line 36, "signals About" should read --signals Aout--.

Line 41, "buffers A and b" should read
--buffers A and B--.

COLUMN 2:

Line 47, "illumines" should read --illuminates--.

Line 67, "cyclically sequentially is" should read
--sequentially in--.

Line 68, "signals About," should read --signals Aout,--.

UNITED STATES PATENT AND TRADEMARK OFFICE
CERTIFICATE OF CORRECTION

PATENT NO. : 4,843,480
DATED : June 27, 1989
INVENTOR(S) : Nishikawa, et al.

It is certified that error appears in the above-identified patent and that said Letters Patent is hereby corrected as shown below:

<u>COLUMN 3</u>:

Line 20, "n" should read --in--.

Line 51, "gate 19" should read --gate 20--.

Signed and Sealed this

Sixteenth Day of October, 1990

Attest:

HARRY F. MANBECK, JR.

*Attesting Officer*    *Commissioner of Patents and Trademarks*